United States Patent [19]
Tanaka et al.

[11] Patent Number: 4,809,108
[45] Date of Patent: Feb. 28, 1989

[54] TAPE RUNNING DIRECTION CHANGEOVER MECHANISM WITH AUTOMATIC TAPE HEAD AZIMUTH ALIGNMENT

[75] Inventors: Shinsaku Tanaka, Tokyo; Toshio Yoshimura, Kawasaki, both of Japan

[73] Assignee: Tanashin Denki Co., Ltd., Japan

[21] Appl. No.: 945,828

[22] Filed: Dec. 24, 1986

[30] Foreign Application Priority Data

Oct. 1, 1986 [JP] Japan .............................. 61-1649[U]

[51] Int. Cl.⁴ ............................................... G11B 5/56
[52] U.S. Cl. .................................... 360/109; 360/104
[58] Field of Search ............... 360/104, 105, 106, 109, 360/75, 76, 77, 96.1, 96.2, 96.3, 74.1

[56] References Cited

U.S. PATENT DOCUMENTS 4,238,808 12/1980 Tomita ............................... 360/109
4,527,210 7/1985 Takamatsu ........................... 360/93

FOREIGN PATENT DOCUMENTS 3311584 10/1984 Fed. Rep. of Germany ...... 360/109
0127942 8/1982 Japan .................................. 360/109
0017624 2/1983 Japan .
0162817 7/1986 Japan .................................. 360/109
0222016 10/1986 Japan .................................. 360/109

*Primary Examiner*—Robert S. Tupper
*Assistant Examiner*—Andrew L. Sniezek
*Attorney, Agent, or Firm*—Wegner & Bretschneider

[57] ABSTRACT

A tape running direction changeover mechanism suitable for use in a tape recorder is described. The mechanism includes a tape running direction changeover member, a pinch roller changeover member responsive to each changeover of the tape running direction changeover member, a pair of azimuth alignment screw support members provided on both sides of a magnetic head and interlocked with the pinch roller changeover member, and azimuth alignment screws screwed in a pair in each of the support members. In accordance with movements of the pair of azimuth alignment screw support members, one or the other alignment screws supported on the respective support members are brought into contact with the corresponding sides of a magnetic head support strip relative to the magnetic head so as to control the vertical position and inclination of the magnetic head.

1 Claim, 5 Drawing Sheets

2
3R
3L
4L
4R
7L
5L
5R
7R
6L
6R
9
11L
11R
10L
8L
14
8R
10R
12
19L
17L
26La
20
16
1
19R
13
17R
18L
22R
18R
22L
21L
26Lb
15
26Ra
21R
26Rb

TAPE RUNNING DIRECTION CHANGEOVER MECHANISM WITH AUTOMATIC TAPE HEAD AZIMUTH ALIGNMENT

BACKGROUND OF THE INVENTION (1) Field of the Invention

This invention relates to a magnetic tape running direction changeover mechanism which can automatically perform an azimuth alignment, i.e., vertical setting of a magnetic head, no matter in which direction the magnetic tape is caused to run.

(2) Description of the Prior Art

In a tape recorder permitting changeover of the running direction of a tape in either one of the two directions, it is desirable that the magnetic head is brought into contact at an appropriate position with a magnetic tape (hereinafter called "tape" for the brevity or simplicity) no matter in which direction the tape is caused to run.

As a mechanism enabling such an azimuth alignment, one example is disclosed in Japanese Utility Model No. 17624/1983.

The mechanism disclosed in the above-mentioned publication can however effect an azimuth alignment when a tape is caused to run in only one direction. It is difficult to incorporate it in a tape recorder which allows to change the running direction of a tape in either one of two directions.

SUMMARY OF THE INVENTION

An object of this invention is therefore to provide a tape running direction changeover mechanism which can automatically perform, without making the structure complex, an azimuth alignment to bring the magnetic head into contact with an appropriate position of a tape no matter in which direction the tape is caused to run.

In one aspect of this invention, there is thus provided a tape running direction changeover mechanism suitable for use in a tape recorder in which paired reel shafts, capstans and pinch rollers are respectively arranged symmetrically at both sides of a magnetic head and the running direction of a tape can be changed over, comprising:

a tape running direction changeover member provided reciprocally for changing over two torque transmission routes, which extend from a motor to the respective reel shafts respectively, from one to another;

a pinch roller changeover member provided reciprocally for bring the pinch rollers into or out of contact with their associated capstans responsive to each changeover of the tape running direction changeover member;

a pair of azimuth alignment screw support members provided on both sides of a magnetic head and interlocked with the pinch roller changeover member; and azimuth alignment screws screwed in a pair in each of the support members;

whereby in accordance with movements of the pair of azimuth alignment screw support members, one or the other alignment screws supported on the respective support members are brought into contact with the corresponding sides of a magnetic head support strip relative to the magnetic head so as to control the vertical position and inclination of the magnetic head.

In spite of the above-described simple structure, the tape running direction changeover mechanism of this invention can automatically bring the magnetic head into contact with an appropriate position of the tape no matter in which direction the tape is caused to run.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
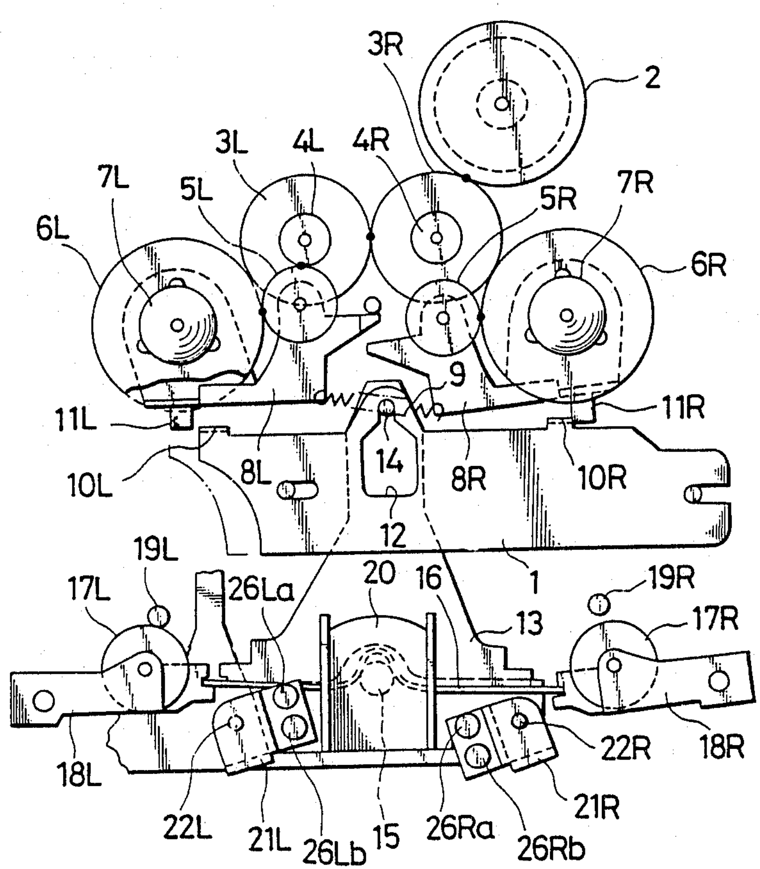
FIG. 1 is a plan view of a tape running direction changeover mechanism according to one embodiment of this invention, in which a tape is running in the leftward direction.

FIG. 1 illustrates only an important part of the tape running direction changeover mechanism according to the one embodiment of this invention. In the drawing, numeral 1 indicates a tape running direction changeover member. This tape running direction changeover member 1 is horizontally reciprocal as viewed in FIG. 1 and is controlled to move, for example, from the right to the left or from the left to the right by an unillustrated control system when a tape has been fully taken up. Of course, it may be controlled by a manual operation in some instances.

Figure 2:
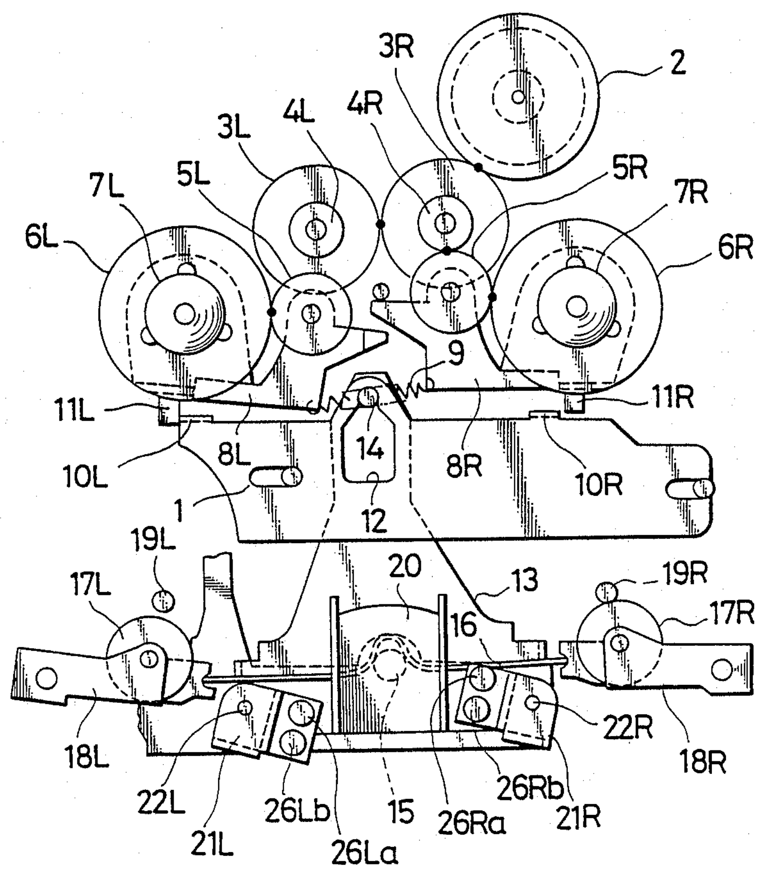
FIG. 2 is a similar plan view but the tape is running in the rightward direction.

When the tape running direction changeover member 1 assumes a right-hand position as depicted in FIG. 1, the rotary force of an unillustrated motor is transmitted to a left-hand reel shaft 7L via gears 2,3R,3L,4L,5L,6L. When the tape running direction changeover member 1 has moved leftwards as depicted in FIG. 2, the rotary force of the motor is transmitted to a right-hand reel shaft 7R via the gear 2,3R and gears 4R,5R,6R.

Incidentally, the gears 5L,5R are supported respectively on members 8L,8R which are turnable about the reel shafts 7L,7R respectively. A tension spring 9 extends between the members 8L,8R. Owing to the pulling force of the spring 9, the gears 5L,5R are biased in such directions that they are brought into meshing engagement with their corresponding gears 4L,4R. On the other hand, the tape running direction changeover member 1 and the members 8L,8R are arranged in such relationship that lugs 10L,10R are selectively brought into engagement with projections 11L,11R respectively. Namely, when the changeover member 1 assumes the right-hand position, the lug 10R is brought into contact with the projection 11R so that the gear 5R is separated from the gear 4R to transmit the rotary force of the above-described motor to the left-hand reel shaft 7L only. When the changeover member 1 assumes the left-hand position on the other hand, the lug 10L is brought into contact with the projection 11L so that the gear 5L is separated from the gear 4L to transmit the rotary force of the above-described motor to the right-hand reel shaft 7R only.

The tape running direction changeover member 1 defines an opening 12, in which a pin 14 of a pinch roller changeover member 13 is engagedly received. The changeover member 13 is supported turnably by a shaft 15. The changeover member 13 is interlocked with reciprocation of the changeover member 1, so that the changeover member 13 is allowed to turn in both directions about the shaft 15. A horizontally-extending long rod-like spring 16 is supported on the changeover member 13. Both horizontal ends of the rod-like spring 16 engage pinch roller support members 18L,18R which support pinch rollers 17L,17R respectively. The left-hand pinch roller 17L is therefore maintained in contact under pressure with a left-hand capstan 19L while the changeover member 1 assumes at the right-hand position as shown in FIG. 1. When the changeover member 1 is at the left-hand position as depicted in FIG. 2, the right-hand pinch roller 17R is maintained in contact under pressure with a right-hand capstan 19R. Needless to say, the force for pressing of each of the pinch rollers against its corresponding capstan is given by the rod-like spring 16.

Figure 3:
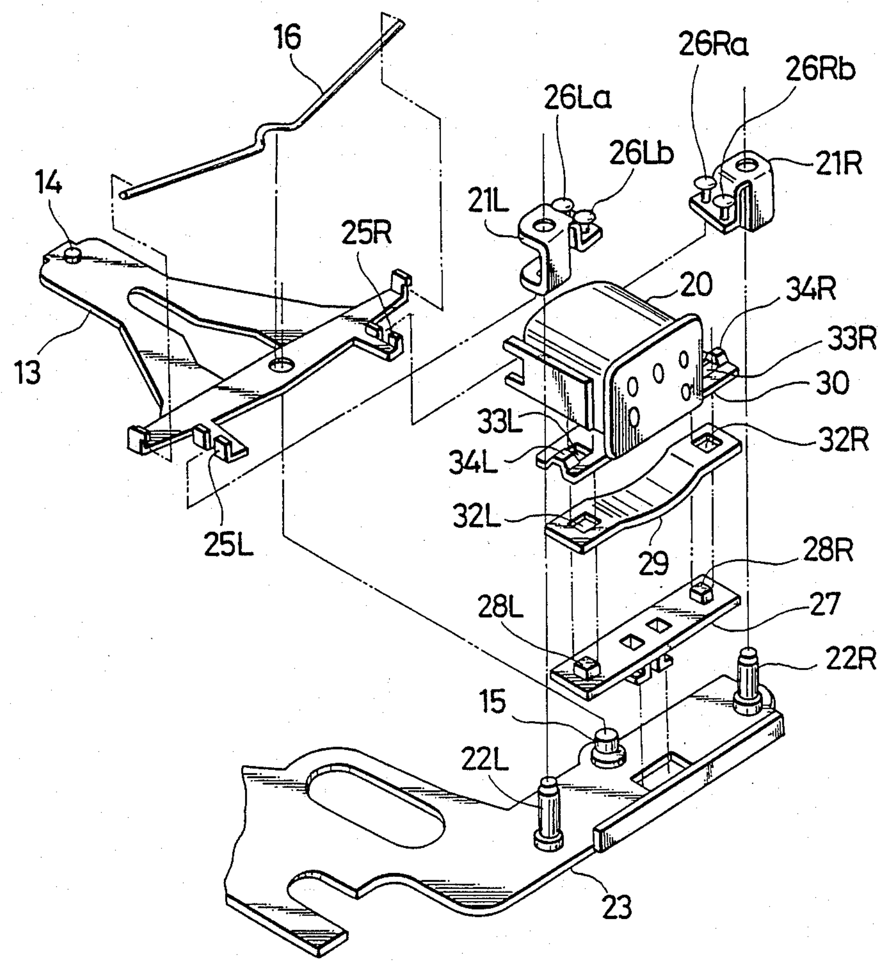
FIG. 3 is an exploded perspective view of a magnetic head and its peripheral parts in the mechanism.

On both sides of a magnetic head 20, there are arranged azimuth alignment screw support members 21L,21R. The support members 21L,21R are provided turnably about their corresponding pivots 22L,22R. Here, both pivots 22L,22R are provided upright on a plate-like member 23 which supports the magnetic head 20 thereon and is movable back and forth as shown in FIG. 3.

Figure 4:
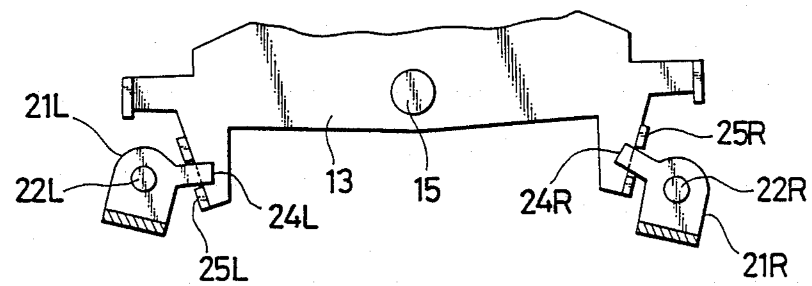
FIG. 4 is a plan view showing the relationship between a pinch roller changeover member and an azimuth alignment screw support member in the mechanism.

The left-hand and right-hand support members 21L,21R are provided with projections 24L,24R respectively as shown in FIG. 4. These projections 24L,24R are maintained in engagement with their corresponding bent portions 25L,25R in a bifurcated shape and formed at left and right end portions of the pinch roller changeover member 13. In the respective azimuth alignment screw support members 21L,21R, azimuth alignment screws 26La,26Lb;26Ra,26Rb are received in front-and-rear pairs.

On the other hand, a mounting base 27 made of a synthetic resin is provided on the upper surface of the plate-like member 23. Guide projections 28L,28R are provided upright on left and right end portions of the upper surface of the mounting base 27. Above the upper surface of the mounting base 27, there are successively arranged a downwardly-arched leaf spring 29 and a magnetic head support strip 30. The magnetic head 20 is secured centrally on the support strip 30. The leaf spring 29 and support strip 30 define guide holes 32L,32R;33L,33R through left and right end portions thereof. The guide holes 32L,32R;33L,33R are fit on their corresponding guide projections 28L,28R, whereby the leaf spring 29 and support strip 30 are movable up and down. Further, upwardly-arched portions 34L,34R are formed at both left and right end portions of the support strip 30 respectively.

Figure 5A:
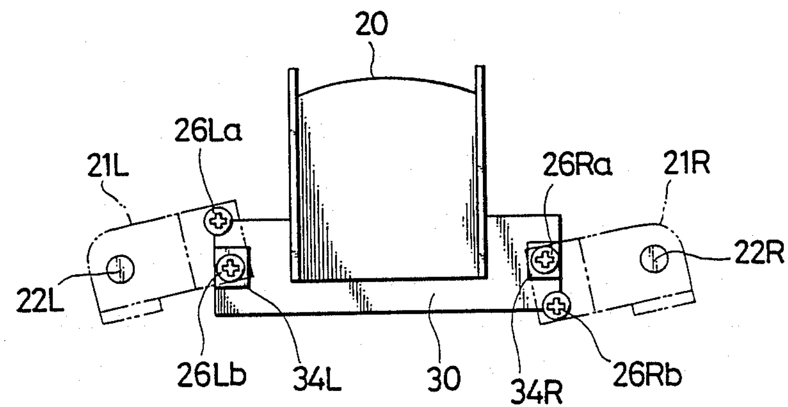
FIGS. 5(*a*) and 5(*b*) are plan views each of which shows the relationship between a magnetic head support strip and azimuth alignment screws in the mechanism.

FIGS. 5(*a*) and 5(*b*) illustrate the relationship between the azimuth alignment screws 26La,26Lb;26Ra,26Rb and the upwardly-arched portions 34L,34R.

Figure 6:
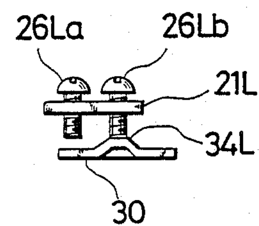
FIG. 6 is a side view showing the relationship between the magnetic head support strip and the azimuth alignment screws in the mechanism.
Figure 5B:
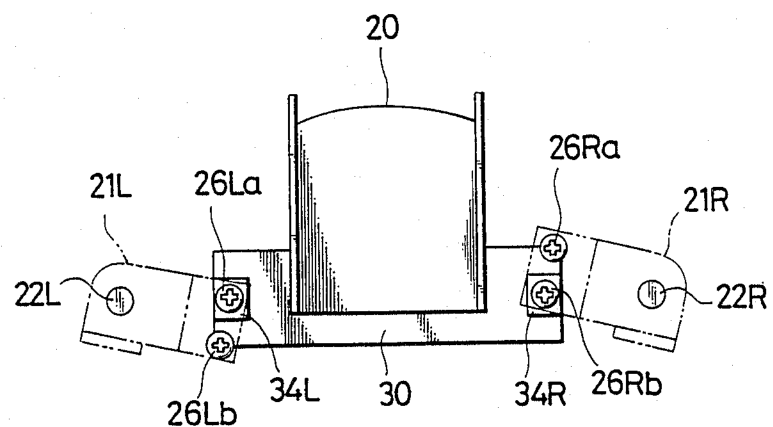

In the state shown in FIG. 1 in which the pinch roller changeover member 13 has turned clockwise, the left-hand member 21L has been turned frontward whereas the right-hand member 21R has ben turned rearward as depicted in FIG. 5(*a*). Hence, as illustrated in FIG. 6, the rear azimuth alignment screw 26Lb is in contact at the bottom thereof with the arched portion 34L on the left and the front azimuth alignment screw 26Ra is in contact at the bottom thereof with the arched portion 34R on the right. The vertical position and inclination of the magnetic head 20 are controlled by these two screws 26Lb,26Ra. In the state shown in FIG. 2 in which the pinch roller changeover member 13 has turned counterclockwise, the left-hand member 21L has been turned rearward whereas the right-hand member 21R has been turned frontward as depicted in FIG. 5(b). As a result, the front azimuth alignment screw 26La is in contact at the bottom thereof with the arched portion 34L on the left and the rear azimuth alignment screw 26Rb is in contact at the bottom thereof with the arched portion 34R on the right. The vertical position and inclination of the magnetic head 20 are controlled by these two screws 26La,26Rb.

Owing to the adoption of the above-described structure, the vertical position and inclination of the magnetic head 20 are controlled by the azimuth alignment screws 26Lb,26Ra when a tape is caused to run in the leftward direction. When the tape is caused to run in the rightward direction on the other hand, the vertical position and inclination of the magnetic head 20 are controlled by the azimuth alignment screws 26La,26Rb. It is hence possible to perform an azimuth alignment so as to bring the magnetic head 20 into contact with an appropriate position of a tape by turning and adjusting these four screws independly in advance, no matter in which direction the tape is caused to run.

Having now fully described the invention, it will be apparent to one of ordinary skill in the art that many changes and modifications can be made thereto without departing from the spirit or scope of the invention as set forth herein.

We claim:

1. A tape changeover mechanism for use in a tape recorder to change-over the running direction of the tape, comprising:

a magnetic head;

paired reel shafts, capstans and pinch rollers arranged symmetrically at both sides of said magnetic head;

a magnetic head assembly, said assembly including a support plate means for supporting said magnetic head;

a tape running direction changeover member reciprocally movable between said reel shafts for changing over a torque transmission route from one of the reel shafts to the other of the reel shafts to provide reversible tape movement between said reel shafts;

a pinch roller changeover member pivotably coupled to said head support plate means at one end thereof and reciprocally coupled to said tape direction changeover member for bringing each of the pinch rollers into or out of contact with their associated capstans responsive to the reciprocal movement of the tape running direction changeover member;

a pair of azimuth alignment screw support members pivotably coupled to said head support plate means, one provided on each side of the magnetic head and interlocked with said pinch roller changeover member;

a pair of azimuth alignment screws in each of said support members;

a magnetic head support strip coupled to the magnetic head;

whereby in accordance with movements of said pair of azimuth alignment screw support members, one or the other alignment screws supported on each of said corresponding support members is brought into contact with a corresponding side of said magnetic head support strip so as to simultaneously control the vertical position and inclination of each side of the magnetic head.

* * * * *